United States Patent [19]

Csajtai et al.

[11] Patent Number: 4,875,809

[45] Date of Patent: Oct. 24, 1989

[54] METHOD FOR STABILIZING CLAY MINERALS DURING OIL EXPLOITATION BY STEAM INJECTION

[76] Inventors: Géza Csajtai, 3 Bozso K. u, Szolnok; Sándor Doleschall, 21/B Varoskuti ut, Budapest; Gyula Milley, 53 Somogyi B. u., Nagykanizsa; Miklós Kristóf, 4 Klauber J. u., Szolnok; Tibor Paál, 16 Beke ut, Nagykanizsa; Dániel Rácz, 47/B Filler u., Budapest II; Béla Tóth, 4 Lowy S. u., Szentendre, all of Hungary

[21] Appl. No.: 187,376

[22] Filed: Apr. 28, 1988

Related U.S. Application Data

[63] Continuation-in-part of Ser. No. 900,782, Aug. 27, 1986, abandoned.

[30] Foreign Application Priority Data

Aug. 24, 1985 [HU] Hungary .............................. 3262/85

[51] Int. Cl.$^4$ ................................................ E02D 3/12
[52] U.S. Cl. .................................. 405/263; 166/305.1; 405/258
[58] Field of Search .............. 405/263, 264, 258, 269, 405/267; 166/305.1, 303, 272; 106/74, 76, 80, 84, 90, 900; 252/8.55 R

[56] References Cited

U.S. PATENT DOCUMENTS

| | | | |
|---|---|---|---|
| 3,382,924 | 5/1968 | Veley et al. | 166/305.1 |
| 3,959,975 | 6/1976 | Graf | 405/263 |
| 4,230,183 | 10/1980 | Ralfoglou | 166/305.1 |
| 4,233,015 | 11/1980 | Teague et al. | 405/263 |
| 4,300,860 | 11/1981 | Yan | 405/263 |
| 4,393,939 | 7/1983 | Smith et al. | 166/293 |
| 4,462,718 | 7/1984 | McLoughlin et al. | 405/264 |
| 4,522,263 | 6/1985 | Hopkins et al. | 166/305.1 |
| 4,532,052 | 7/1985 | Wearer et al. | 166/307 |
| 4,536,305 | 8/1985 | Borchardt et al. | 405/264 |
| 4,553,597 | 11/1985 | Le Ribault et al. | 166/305.1 |
| 4,563,292 | 1/1986 | Borchardt | 166/305.1 X |
| 4,572,297 | 2/1986 | Thigpen et al. | 166/307 |
| 4,574,886 | 3/1986 | Hopkins | 166/305.1 X |
| 4,625,802 | 12/1986 | Sydansk | 405/263 X |

*Primary Examiner*—Dennis L. Taylor
*Attorney, Agent, or Firm*—Michael N. Meller

[57] ABSTRACT

The present invention relates to a new process for stabilizing the clay minerals in reservoir rocks containing oil, in particular in rock comprising sandstones, sand, or marliceous sandstones as well as eliminating the electrostatic dispersion and swelling of the clays when steam injection is used for mineral oil exploitation. According to the process, cations capable of stabilizing the reservoir rock, having a hydrated diameter of 0.13 to 0.15 nm, preferably potassium and/or ammonium and/or zirconium ions are introduced in the form of a 0.01 to 5.0 N aqueous solution or in the form of a vapor mixture or a mixture of steam and gas(es).

10 Claims, No Drawings

METHOD FOR STABILIZING CLAY MINERALS DURING OIL EXPLOITATION BY STEAM INJECTION

This is a continuation-in-part of application Ser. No. 06/900,782, filed Aug. 27, 1986, now abandoned.

TECHNICAL FIELD

The present invention relates to a new process for stabilizing the clay minerals in oil-containing reservoir rocks, in particular in rocks such as sandstones, sand, or marliceous sandstones, as well as for eliminating electrostatic dispersion and swelling of the same when steam injection is used for oil exploitation.

BACKGROUND ART

The so-called thermic methods represent a significant group of secondary and tertiary methods of oil expoitation, in the course of which the highest possible part of oil reserves which could not be exploited traditionally are attempted to be mobilized partly by oxidation in situ, partly by injecting steam or vapor mixtures.

In the specification of the present invention, the scope is restricted to the injection of steam, a mixture of vapor, steam containing carbon dioxide and mixtures of vapors containing carbon dioxide; within this far-reaching field which includes a plurality of technical problems, we are particularly dealing with the behavior of the clay minerals of reservoir rocks, as they play a most determinant role in defining the hydrodynamic state of reservoir rocks.

It is a well known fact that clay minerals with a layer structure of 2:1, e.g. the montmorillonites, are capable of considerable hydration, as a consequence of which the size of the cells increases in the direction of the C-axis, their stability decreases, and their dispersion begins. In the course of clay dispersion, the content of the suspended material of fluids (in particular water and oil) flowing in the interconnected pore system of the rock increases, which accumulates in certain parts of the rock (due to mechanical filtration or for colloid-chemical reasons) and forms local flow barriers, thus deteriorating the average permeability and increasing detrimental heterogeneity. Swelling and dispersion are especially harmful, if the ionic character of the rock determined by the original fluids, i.e., the natural state of equilibrium, is disturbed by relatively drastic methods, such as steam injection.

It is quite obvious, that not only the state of the clay minerals but also the thermodynamic conditions of the whole environment—in particular, in zones surrounding the well—are changed, while these changes exert a considerable effect, generally disadvantageous changes on the hydrodynamic properties of the porous system, as a consequence of the modified permeability of the rock, as described hereinabove.

If steam or steam also containing organic compounds is injected, it is obvious that a more or less superheated steam phase has to be injected. However, in this way condensation within the rock, i.e., quick and considerable dilution of the aqueous phase cannot be avoided either, so the original ionic character diminishes. As water molecules can be incorporated easily into the clay minerals, with a high energy, the natural ion content of the clays is exchanged, the clays begin to swell and become dispersed; this phenomenon can result—in particular with rocks with a high clay content—in the collapse of the structure, up to the collapse of the zones in the environment of wells.

Summing up what has been said, in addition to other factors, inhibition, elimination of changes in clay minerals, the so-called clay-effect is of utmost importance.

SUMMARY OF THE INVENTION

The present invention relates to a method of stabilizing clay minerals of oil reservoir rocks, in particular in the case of rocks containing sands, sandstones and marliceous sandstones when exploitation of oil is performed by steam injection. First of all, clay minerals capable of swelling and having a layer structure of 2:1 are stabilized prior to and/or simultaneously with steam injection with cations introduced into the reservoir rock, said ions having a hydrated diameter of 0.13 to 0.15 nm and a coordination number 12, which means that the swelling capability of the clays is inhibited; in the course of said treatment the cations, having been introduced in an aqueous solution or steam phase into the reservoir, rock are incorporated into the inner structure of the clay minerals and/or are fixed therein, thus reducing the size of the unit cell of the clay minerals in the direction of the C-axis, and also reducing the inner hydrate contents, porosity, sorption capacity and heterogeneity. At the same time, the permeability of the rock is increased and stabilized during the course of injecting the steam. In such a manner, steam can be injected undisturbed, with less expenditure of energy, thus forming the prerequisite of efficient application of thermic exploitation of hydrocarbons, when steam is injected.

DETAILED DESCRIPTION OF THE INVENTION

During our experiments we found that the cell size of clay minerals, in particular those tending to swell and having a layer structure of 2:1, e.g., montmorillonite, bentonite, nontronite, vermiculite, etc. in the direction of the C-axis can be reduced. Additionally, the Si-Al layers can be brought nearer to each other with high energy. If cations are introduced into the aqueous environment, which become fixed in the layer structure by exchanging the $Na^+$, $Ca^{2+}$, $Mg^{2+}$ ions of the clay. Thus, they considerably increase the electrostatic binding energy of the layers, i.e., the clays are stabilized, and simultaneously dispersion is inhibited. For this purpose cations are preferably used with a hydrated diameter of 0.13 to 0.15 nm and with a coordination number 12, the salts of which are soluble in water and dissociate to the required extent, e.g., different potassium and ammonium salts, and some zirconium salts.

In several cases it can be misleading that the clay content capable of swelling in certain sandstones or marliceous sandstones, seems to be negligible in comparison to the total mass of the rock, e.g., not more than 3 to 5%. In other words, the clay is present in a dispersed state, so the role and effect to be expected are not taken into account. However, it can be demonstrated that grains of the clay minerals play a role of utmost importance in consolidation of the other mineral rock-forming components, in the natural cementing thereof. Accordingly, the effect of the clays does not reside merely in their own dispersion but they also can influence the stability of the whole rock. Their own cementing role ceases in the course of dispersion, while the original permeability of the rock drastically changes.

In connection with methods based on the injection of steam, mixtures of vapors, steam and gaseous media, e.g. $CO_2$, we wish to call attention to the fact& that the sorption features of the loosened dispersed clays are negatively changing, they increase considerably. Considering the fact that certain organic groups and molecules may be also incorporated into the clays, frequently with a higher swelling energy than water, displacement of solid surfaces in the oil-wet direction can be really most disadvantageous.

We were able to demonstrate that, due to the effect of the inhibiting cations, the dispersion of clays considerably decreases. Moreover, depending on the concentration, it can fully stop, so that by the inclusion thereof, advantageous conditions can be obtained for steam injection.

Treatment of the reservoir rock can be performed in such a way that, prior to steam injection, the cations selected for the treatment are introduced into the layer in the form of an aqueous solution with a concentration in the range between 0.01 to 5.0 N preferably 0.05 and 3.0 N. The aqueous solution is introduced as a slug of a size of 0.005 to 0.7, preferably 0.05 to 0.5, calculated on the pore volume of the rock situated between the proding well and the injecting bore. Thereafter the system is allowed to rest in order to restore the thermal equilibrium. The period of rest is followed by injecting the steam. As a consequence of steam injection, the thermal state of the injected tract of the reservoir rock changes, the temperature rises and, as a result, inhibiting cations are incorporated at an accelerated rate, since—according to our experience—the process or ion-exchange fixation is an endothermic process.

The temperature of the injection of the steam, vapor mixtures or steam/gaseous mixtures, as noted above, is about 190°–300° C., preferably 200°–300° C. at reservoir pressures.

Together with the steam phase, inhibiting cations may be introduced into the rock to be treated in the form of any compound which is in the vapor phase at the temperature of steam injection; this method is well applicable even if the compound undergoes thermal dissociation. However, later, in the condensed phase in water the ions of the original compound should be unchanged. In these cases, for inhibiting the clay effect, e.g., volatile ammonium salts, such as ammonium hydroxide, ammonium carbonate, ammonium hydrogen carbonate, etc., or volatile potassium salts, such as potassium formate, potassium acetate, potassium hydrogen carbonate, etc., can be successfully used.

Inhibiting cations can be introduced not only prior to steam injection but also during the process, as an intermediate step. Moreover, inhibition with an aqueous phase cas be combined with inhibition with a steam phase in one or more treating cycles, by guaranteeing the qualitative and quantitative indices in compliance with the preliminary examinations on the properties of the given reservoir rock.

For the treatment with inhibitors, potassiumn, and/or ammonium, and/or zirconium ions are applied in a concentration of from 0.01 to 5.0 N, in a volume of 0.005 to 0.7 in an aqueous, steam-phase or in the phase of the mixture of steam and gaseous medium, related to the pore volume of the reservoir rock situated between the wells. Depending on the peculiar feature of the reservoir rock, the treatment can be performed with a series of smaller slugs, of increasing or decreasing concentration, by introducing the slugs comprising the inhibiting ions, with or without spacer fluid slugs.

The introduction of inhibitor ions used in the phases of steam, vapor-mixture or mixture of steam and gaseous medium can be performed by recovering the slugs consisting of the injected steam, steam/gas or the mixture thereof, repeating this cycle of injection/recovery more than once, in order to intensify the interaction between the injected fluid(s) and reservoir rock.

The inhibition of the clay-effect is preferable even in the case when prior to the injection the heterogeneity of the reservoir rock to be injected with steam is balanced.

The method of inhibition of the clay-effect—when oil is exploited by steam injection—yields the following advantages:

1. Dispersion of clay minerals resulting from swelling may be restricted or excluded, thus the stabilization of the reservoir rock is assured.
2. By stabilizing the rock structure, improved permeability can be achieved which is advantageous in further processes, e.g., to perform steam injection combined with the use of carbon dioxide.
3. The injected steam will be distributed more uniformly in the reservoir rock, the energy expenditure is less, the injected thermal energy can be better utilized.
4. The flooded reservoir area may be enlarged, heterogeneity diminishes.
5. The sorption capacity of the rock will decrease, enabling the treatment with chemicals with a low loss of the chemical in the course of further technological steps (e.g., vapors of organic compounds otherwise resulting in a considerable clay swelling can be injected).
6. Steam can be injected into reservoir rocks, into which the process could not be performed otherwise without damaging the layer.

EXAMPLE 1

Steam injection was carried out at a pressure of 60 bar, at a temperature of 493° K. with a steam of a quality of 0.8. The model rock was prepared from a non-consolidated rock grist of a diameter of 4.91 $cm^2$, of a porosity of 0.31, of a length of 100 cm and comprising 4.7% by weight swelling clay, by compression.

The steam was injected at a rate of $7.5.10^{-2}$ $cm^3/s$, the depression measured at the beginning of the injection was 0.345 bar.

After a steam injection of 1.0 Vp the depression increased to 0.476 bar due to the 28% decrease of the permeability of the swelling clays.

In order to eliminate the clay-effect for the stabilization of the clay minerals $NH_4^+$ ions were injected into the rock in the vapor phase in an amount of 1.1 g/kg of swelling clay. Then the system was allowed to stand for 2 hours.

After the treatment the steam injection was continued, when first 0.314 bar depression was measured and the depression stabilized at a value of 0.330 bar after the injection of 1.0 Vp of steam. Due to the treatment the swelling of the clays was eliminated, the clays were stabilized while the hydrodynamic parameters of the rock were also stabilized.

EXAMPLE 2

The parameters of the model rock were as follows:
Non-consolidated rock prepared by compression
  length: 100 cm
  porosity: 0.30,
  air permeability: 143 mD.

The test pressure was 60 bars, the temperature of the steam was 493° K., the quality of the steam was 0.8.

Before the steam injection a 1:1 mixture of $K^+$ and $NH_4^+$ ions was introduced in the vapor phase in an amount of 1.2 g/kg of swelling clay. Then it was allowed to stand.

At the beginning of the steam injection at a rate of $7.54 \cdot 10^{-2}$ cm$^3$/s, a depression of 0.294 bar, while after a steam injection of 1.0 Vp 0.301 stabilized depression could be measured.

During the steam injection the decrease of the permeability of the rock proved to be insignificant, i.e. the swelling ability of the clay minerals ceased as a result of the treatment, the clays stabilized.

Without detailing all possible variation of clay-effect inhibition it should be emphasized that several modifications are possible within the scope of the claims.

What we claim is:

1. A process for stabilizing a reservoir rock having a layer structure of 2:1 containing clays, said process comprising introducing into said rocks a solution of cations having a coordination number 12 and having a hydrated ion diameter of 0.13 to 0.1 nm.

2. The process according to claim 1, wherein said cations are selected from the group consisting of potassium ions, ammonium ions and zirconium ions.

3. The process according to claim 2, wherein said cations are in the form of a 0.01 to 5.0 N aqueous solution.

4. The process according to claim 3, wherein the solution is a 0.01 to 3.0 N aqueous solution.

5. The process according to claim 1, wherein said cations are introduced in vapor form in a volume 0.005 to 0.7 times the pore volume of the reservoir rock.

6. The process according to claim 5, wherein the cations are introduced in vapor form in a volume 0.01 to 0.5 times the pore volume of the reservoir rock.

7. The process according to claim 3, wherein said solution is introduced as a single slug or as a plurality of slugs separated by water spacers.

8. The process according to claim 2, wherein said cations are added as mixtures of cations in a weight ratio of $K^+:NH_4^+ = 0.01$ to 1000.

9. The process according to claim 2, wherein said cations are added as mixtures of cations in a weight ratio of $K^+:ZrO^{++} = 0.01$ to 500.

10. The process according to claim 2, wherein said cations are added as mixtures of cations in weight ratio of $(K^+ + NH_4^+):ZrO^{++} = 0.01$ to 1000.

* * * * *